United States Patent
Gobez et al.

(10) Patent No.: US 7,820,938 B2
(45) Date of Patent: Oct. 26, 2010

(54) BUTT WELDING METHOD OF TWO SHEET METALS IN A CONTINUOUS LINE PROCESSING INSTALLATION

(75) Inventors: Pascal Gobez, Veauche (FR); Stéphane Barjon, Montrond les Bains (FR)

(73) Assignee: Siemens VAI Metals Technologies SAS, St. Chamond (FR)

( * ) Notice: Subject to any disclaimer, the term of this patent is extended or adjusted under 35 U.S.C. 154(b) by 1258 days.

(21) Appl. No.: 11/125,333

(22) Filed: May 10, 2005

(65) Prior Publication Data
US 2005/0242071 A1 Nov. 3, 2005

(30) Foreign Application Priority Data
Apr. 29, 2004 (FR) .................................. 04 04619

(51) Int. Cl.
*B23K 26/32* (2006.01)
(52) U.S. Cl. ................................. 219/121.64
(58) Field of Classification Search ............ 219/121.64, 219/121.63, 121.85, 121.82; 228/212, 49.1, 228/49.4
See application file for complete search history.

(56) References Cited

U.S. PATENT DOCUMENTS

| | | | | |
|---|---|---|---|---|
| 4,623,777 A | * | 11/1986 | Aihara et al. | 219/121.6 |
| 4,626,651 A | * | 12/1986 | Taniguchi et al. | 219/121.63 |
| 4,854,493 A | * | 8/1989 | Fujii et al. | 228/5.7 |
| 4,935,081 A | * | 6/1990 | Becking | 156/157 |
| 4,988,845 A | * | 1/1991 | Bauer et al. | 219/121.63 |
| 5,018,535 A | * | 5/1991 | Da Silva et al. | 131/60 |
| 5,182,428 A | * | 1/1993 | Jack et al. | 219/121.63 |
| 5,190,204 A | * | 3/1993 | Jack et al. | 228/5.7 |
| 6,429,398 B1 | * | 8/2002 | Legoupil et al. | 219/97 |
| 6,783,052 B2 | * | 8/2004 | Liao et al. | 228/4.5 |

FOREIGN PATENT DOCUMENTS

EP 0 534 704 A1 3/1993

OTHER PUBLICATIONS

ASM Handbooks Online, vol. 6, Laser Beam Welding Chapter, Chapter 2, p. 1.*

* cited by examiner

*Primary Examiner*—Samuel M Heinrich
(74) *Attorney, Agent, or Firm*—Laurence A. Greenberg; Werner H. Stemer; Ralph E. Locher

(57) ABSTRACT

A method is provided for adjusting the thickness of the welding bead of two bands obtained by butt welding by means of a laser beam without using filler material. The bands are clamped in jaws, both cut edges being spaced apart by a reference distance. Then the mobile jaw is moved along a travel. Said travel differs from said reference distance by an offset calculated in relation to the thickness of the bands, and while taking into account the degree of accuracy of the positioning and of the cut of said edges. The offset is counted as positive or negative, in order to obtain a final welding position such that it exists, between the edges, an actual allowance, positive or negative, adapted to the thickness of the bands.

25 Claims, 2 Drawing Sheets

BUTT WELDING METHOD OF TWO SHEET METALS IN A CONTINUOUS LINE PROCESSING INSTALLATION

The present invention concerns a method for butt-welding two sheet metals by means of a laser beam. It applies particularly to welding conducted for connecting sheet metal reels together at the inlet of known continuous line processing installations, used in the steel industry.

Indeed, steel manufacturing, transforming and coating lines are designed today for continuous operation, where several processes are coupled together to be chained without needing to manufacture intermediate reels, hence wasting time and material.

To this end, such installations comprise in their inlet sections, a section for connecting reels by welding. There exists various means to perform such welding operations, but generally speaking, a welding section must comply with specific problems raised by the connection of the reels.

Generally, a welding machine comprises two clamping means each having two jaws intended to immobilise the sheet metals. One clamping means is situated downstream, in the running direction of the band, to immobilise the tail of the band belonging to the reel which has been inserted into the line; the other clamping means is upstream, to immobilise the head of the band belonging to the band which has to be inserted in the line by connecting it to the previous band.

Various centring devices enable to align the sheet metals of both reels before being clamped between the jaws. The welding machines also generally comprise integrated shears enabling to cut precisely and cleanly the ends of the bands to be connected. The role of the sheers is essential for the quality of the welding bead performed and for the thickness of the welding bead obtained.

As known and in the most common fashion, the final cut for preparing the ends of the bands is made in welding machines. The sheet metals are immobilised in the clamping jaws while protruding therefrom to leave the possibility of cutting the ends to an accurate size, by producing a slight overhang of each sheet metal with respect to the end of the jaw immobilising said sheet metal. Indeed, in order the ends of the sheet metals to behave correctly, without deformation, the jaws are massive metal parts which risk absorbing the heat from any energy source located too close and therefore the welding process should not be conducted too close to the jaw.

According to the type of process taking place on the line, the thickness of the welding bead is an important parameter to be taken into account. Said thickness may have the same value as that of the sheet metals to be connected, or a different value, and an excessive thickness may be tolerated or not.

In principle, it would be preferable to weld with a certain build-up or excessive thickness, since it is a sign of solidity of the weld, and the processing lines do not tolerate welding ruptures which involve prolonged stoppages to restore the installations to working order.

However, all the various processes implemented do not enable to tolerate excessive thicknesses.

In particular, etching lines, which are currently and generally coupled to rolling lines, or continuous rolling lines comprise generally a flash butt-welding machine in their inlet section, and the generated raw welding bead has an irregular pad which may damage the band back-up rolls situated in the line and may break when passing between the rolls of the roll stand. The machine is then fitted with a planning or grinding machine enabling the pad to be reduced to a size which may be smaller than that of the thickness of each of the connected sheet metals. But such a machining by planning may make the welding bead brittle, in particular if the planning device has become out of alignment or if the tools have been damaged.

In other lines, the welding machine used is of castor-type, where the welding process is carried out by partial overlapping of both sheet metals. Such welds are crushed when being performed by the welding castor wheels themselves, and by rollers especially designed to that end. In spite of the precautions taken, a welding bead is performed with an excessive thickness reaching approximately 10% of the thickness of the sheet metals, when the latter is of the order of 0.3 millimeter to 1 millimeter, and may reach much greater value for very thin sheet metals each of which is around 0.15 millimeter thick. Such excessive thicknesses are tolerated in lines having a skin pass roll stand for example but they are not acceptable in other cases, such as on shiny galvanised sheet metals, where the excessive thickness may be embossed in the reel at the output of the line and may mark the sheet metal over several spires.

Other techniques, such as plasma, micro plasma and laser welding, have been also used for connecting bands by welding. A shortcoming associated with plasma welding is the enlargement of the thermally affected zone and the hardening of the metal in this zone, rendering the welding bead more brittle. But such shortcoming has been solved in micro plasma welding which is used for very thin sheet metals. This process is used however especially for welding small-sized parts and not for welding very wide sheet metals.

In principle, laser welding solves such problem, since it enables the thermally affected zone to be reduced, but it requires very high cutting accuracy. Indeed, taking into account the very small diameter of the beam, if the sheet metals are not rigorously contiguous, there will be no heating, or hardly any heating, and the welding bead will be of a poor quality.

Thus, in document U.S. Pat. No. 4,626,651, the maximum interval between the ends of the bands assessed over the whole length thereof is minimised, first before the cutting operation, by selecting an appropriate overhang length and a cutting angle which are adapted to the thickness of the bands, then, by rotating one of the plates with respect to the other one in their common plane, before the laser welding operation. But this only solves partially the problem of quality of the obtained welding bead, since the interval may remain significant. Moreover, the device for aligning the bands is complex and its implementation is expensive.

To remedy this shortcoming, it has been proposed to press both edges of the sheet metals against one another with significant strength when passing the laser beam to guarantee the absence of any gap between the ends. But this causes a bulb when the metal becomes pasty and the problem of excessive thickness crops back, which ought to be controlled. Moreover, this method is not possible for very small thicknesses. Indeed, because of the sheet metals overhang with respect to the edges of the clamping jaws, an excessive pressure might buckle the ends of the sheet metals.

To avoid this application with pressure of both ends of the bands, their ends must be perfectly rectilinear and parallel. Various devices for guiding and centring the sheet metals enable to perform an alignment and a positioning as perfect as can be, then the ends thereof are cut using mechanical shears, for example of guillotine type, or even using a laser beam. After the sequence of preparation of the ends of the bands, both sheet metals are brought together so as to be contiguous and the welding process is conducted by laser beam.

U.S. Pat. No. 4,854,493, for instance, enables the bands to be aligned using translation and pivoting mechanisms. Optical devices enable the space remaining between the ends of both sheet metals to be controlled in order to perform such alignment. Magnetic clamping means, whose current is controlled, enable the thinnest sheet metals to be immobilised without causing any deformations.

Such devices which are sometimes redundant increase the price of the welding equipment significantly and the implementation thereof in a complete sequence leads to a connection cycle of the bands which may be rather long.

Moreover, all these operations, as well as the displacement and positioning operations of the sheet metals and of the jaws themselves, have been carried out with certain inaccuracy. Whereas the purpose is to obtain a zero allowance between the ends of the bands, the more manoeuvres or operations, the greater the uncertainty regarding the value of the allowance obtained when abutting the edges.

There is hence a risk, taking into account such uncertainties and failing very precise optical control, that the ends of the sheet metals are abutted with too small allowance or, conversely, with excessive allowance.

This uncertainty may reach several hundreth millimeters and, if the jaws are displaced by the value of their nominal travel without giving attention to the tolerance with which said displacement is carried out, in certain cases, the sheet metals will be pressed against one another by a few hundredth millimeters and, in the other case, there will remain a gap between the ends of the sheet metals of the same order of magnitude. This can be extremely detrimental to the quality of the welding bead and also produce uneven quality if the obtained result, in terms of allowance between the ends of the sheet metals, is not always the same. The sheet metals are generally positioned between the jaws to have a slight overhang of a few millimeters and an excessive travel of a few hundredth millimeters may already generate significant pressure, even more so that heating of the ends in contact causes additional expansion, which will increase said pressure still further.

For thicker sheet metals, this phenomenon will produce an excessive thickness in the welding bead. For smaller thicknesses (0.15 to 0.35 millimeter for example), such pressures may buckle the ends and damage the quality of the welding bead. Conversely, in the case of insufficient bringing-closer travel, the welding bead may be broken, thereby producing brittle band junction.

The present invention brings a solution to all the aforementioned problems, by providing a method enabling in a continuous line processing installation comprising a laser beam welding device and without using filler material, to control the thickness of the welding bead between two successive bands, while taking in account, in particular, the thickness of the bands to be welded.

The invention concerns therefore, generally speaking, a butt welding method, by laser or other beam, without using filler material, for two bands running successively, along a longitudinal direction, in a continuous line processing installation, wherein a downstream end, in the running direction, of a first band and an upstream end of a second band are held respectively, by two double-jaw clamping means and welded by passing a laser beam and without using filler material, a method wherein, after clamping and immobilisation in said clamping means, said ends are cut so as to provide two rectilinear and parallel edges, each spaced away from the corresponding end of the jaws by a overhang distance, then said cut edges are approximately contacted by relative displacement of said clamping means towards one another and the welding bead is made by passing the laser beam along a contact plane between the edges.

According to the invention, both cut edges being spaced apart, after cutting, by a reference distance, bringing the clamping means towards one another is controlled over a travel which differs from said reference distance by a preset play or "offset", calculated beforehand in relation to the thickness of the bands and while taking into account the degree of accuracy of the positioning and of the cut of said edges, said preset play being counted as positive or negative in order to be subtracted or added to the reference distance for determining the bringing-closer travel, in order to obtain a final welding position, such that it exists, between the edges of both bands, an actual allowance or "gap" having the same sign, positive or negative, as the preset play.

In a first embodiment, prior calculation leads to a preset play which is either negative or zero and to an actual allowance of negative or zero value, the welding bead thus obtained having a thickness slightly greater than that of each band to be welded, but the excessive thickness being controlled.

In another embodiment, the calculation step leads to a preset play, and consequently to an actual allowance, of non-zero positive value, which enables to obtain a welding bead less thick than each of the sheet metals to be welded.

Preferably, for calculation of the preset play, the cutting accuracy of each of the ends of the sheet metals, the positioning tolerance of the mobile jaw, and the expansion of the ends of the sheet metals are taken into account, on top of the sum of both overhang distances L1+L2, to obtain, in the final welding position, an actual allowance, the amplitude of which depends on the chosen value of the preset play but remains included within a tolerance interval allowing control of the thickness of the weld bead as a function of the thickness of the sheet metals.

Usually, one of the clamping means is fixed and the other is mobile for bringing closer the edges of both bands after cutting.

In a preferred embodiment, the position of the mobile jaw is obtained by the application of a reference surface associated with said mobile jaw against at least one adjustable mechanical stop for obtaining an actual allowance remaining in the expected tolerance interval.

Advantageously, after the step of bringing the jaws closer into the final welding position, the value of the residual allowance existing between both bands is measured and the position of the mobile jaw is corrected by said value by modification of the position of the stops adjusting the limit of travel of the mobile jaw.

In an embodiment, after the step of bringing the jaws closer into the final welding position, the value of the residual allowance existing between both sheet metals is measured at one point and the position of the mobile jaw is corrected by said value by a differential modification of the position of the stops adjusting the limit of travel of the mobile jaw.

In another embodiment, after bringing-closer the flairs into the final welding position, the value of the residual allowance existing between the sheet metals is measured at two points and the position of the mobile jaw is corrected by said value by a differential modification of the position of the stops adjusting the limit of travel of the mobile jaw.

In a first embodiment, the step of cutting the ends of the sheet metals to be welded is performed using a blade shearing machine.

As a variation, the phase of cutting the ends of the sheet metals to be welded is performed using a laser beam having the same source as the laser used to generate the welding beam.

Other advantageous characteristics of the invention will appear in the following description of a particular embodiment given as a non limiting example.

Generally speaking, a machine for connecting bands by welding includes band clamping means, which may be brought closer to one another, means for cutting the ends of the bands and a welding device, which have not been represented.

Figure 1:
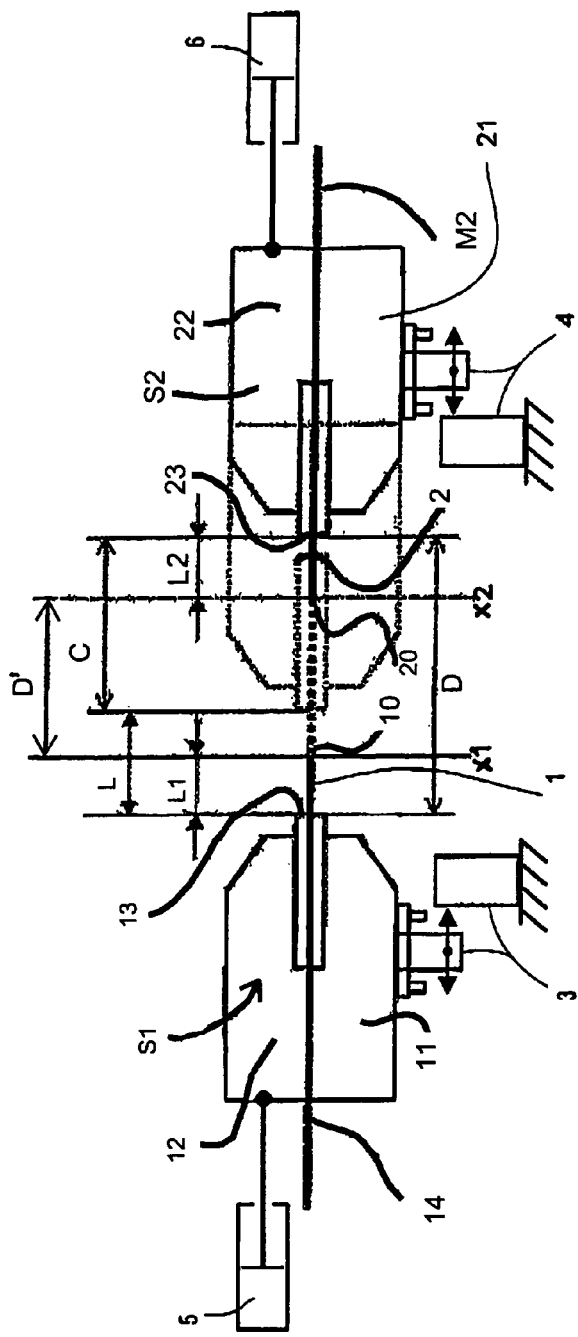
FIG. 1 represents schematically the relative positions of the clamping jaws of a laser welding machine for implementing the invention.

FIG. 1 shows the general arrangement of the components of a laser welding machine so as to describe the method of the invention. The clamping means S1 and S2, usually named clamping jaws, each comprise two jaws, respectively a lower jaw 11, 21 which is placed on the same level as the running plane of the bands and an upper jaw 12, 22, vertically mobile. These clamping means $S_1, S_2$, are represented in spaced apart position by a distance D enabling the cut of the ends of two successive bands M1 and M2. If the band runs in the direction from S1 to S2, it is said that S1 is the inlet jaw and S2 the outlet jaw. Shearing means may be brought into positions X1 and X2 for cutting the ends 10, 20 of the bands, and these cutting positions lie at a distance respectively L1 from the edge of the jaw S1 and L2 from the edge of the jaw S2. When running the end of the first reel, the tail of the band has been stopped slightly upstream of the edge of the jaw S2, at any distance smaller than D. Then, a shearing member has been inserted for cutting the end 20 of the band in position X2, leaving a overhang L2 with respect to the edge 23 of the jaw S2. Then, the head of the band M1 coming from the following reel has been inserted, into the machine by making it protrude from the inlet jaw S1 by any length smaller than D. A shearing member has then been inserted in position X1 so as to cut the end 10 of the band M1 leaving an overhang L1 with respect to the edge of the inlet jaw. All this process has been the subject of numerous descriptions and the principles do not differ from the other types of welding machines, such as castor-type welding machines and it is not necessary to describe more in detail all the devices and their operation. The cutting member may be single, or the machine may have two different cutting means. It may be composed of mechanical shears, preferably of guillotine type, or the bands may be cut using a laser beam. Preferably, the same cutting member should be used for cutting the ends of both bands so as to obtain perfectly parallel edges 10, 20.

The method according to the invention will now enable to bring end to end both bands to be connected and to weld them while controlling the thickness of the welding bead to be realised. To do so, at least one of both jaws S1, S2 is mobile and may be brought closer to the other. For example, currently, the outlet jaw S2 is mobile. It is mounted in a structure not represented wherein it is guided in translation, while remaining parallel to itself and its movement is parallel to the running axis of the band. To do so, it may move under the action of two actuators 6 placed on each side, outside the running zone of the band. These actuators 6 are fitted with position sensors which enable to control the travel of the mobile jaw S2.

However, in an embodiment according to the invention, the actuators 5, 6 push the mobile jaw S1,S2 towards an adjustable mechanical stop 3, 4. This adjustable stop 3, 4 will then determine with accuracy the exact travel C which the mobile jaw will follow. Preferably, a stop 3, 4 will be installed on each side of the mobile jaw S1, S2 to delineate the travel of each movement control actuator 5, 6. Said adjustable stops 3, 4 may advantageously be of wedge-type and adjustment is made by moving the wedges relative to one another. A gear motor and a screw and nut device enable to control the displacement of the wedges. A pulse generator-type sensor mounted on the shaft of the motor enables to adjust the position of the wedges and hence the stop with great accuracy. The same motor may control advantageously both stops installed on each side in a perfectly synchronous fashion. At the end of travel, a reference surface solid with the mobile jaw is applied to the mechanical stop.

In an improved embodiment of the invention, it may also be proposed that both adjustable stops, for example the wedge-type device, have each their own means of adjustment. A pulse generator is then installed on each of both control motors, thereby offering the possibility of a differential action. It is thus possible, if needed, by adjusting each stop independently, to correct a dissymmetric cutting defect noticed, such a parallelism defect in the ends of the bands.

D is the initial distance between both ends 13, 23 of the jaws when they are in the spaced apart position wherein the ends of both bands have been inserted, and then cut, both cut edges 10, 20 being perfectly parallel and spaced apart by a reference distance D'=D−(L1+L2).

The travel C of the mobile jaw S2 should be, theoretically, equal to this reference distance D' for simply contacting both cut edges 10, 20.

However, according to the invention, the actual bringing closer travel C will be slightly different from the reference distance D' for controlling the thickness of the weld bead, this difference D'−C being equal to a preset play or offset, positive or negative, which is calculated in advance as a function of the thickness of the sheet metals and taking into account the degree of accuracy of the cut of the edges and the positioning of the jaws.

Thus, after bringing closer the jaws $S_1$, $S_2$ over the travel C, thus calculated, the actual distance L between the jaws will determine, between the edges 10, 20 of both sheet metals, an actual allowance or gap equal to D'−C and having the same sign, positive or negative, as the offset and being, relative to the latter, within a tolerance interval allowing to control the thickness of the weld bead as a function of the thickness of the sheet metals.

The "gap" or "actual allowance" described herein corresponds to a slight spacing between edges 10, 20 of both bands, whereas a negative allowance corresponds to a squeezing of the edges since, in this case, the travel C is higher than the reference distance D' corresponding theoretically to a contact end to end between the bands.

Practically, $L_1$ and $L_2$ being both overhang distances provided in relation to the thickness of the sheet metals to be welded, the travel C of the jaw will be preset by the stop so as to obtain a final distance L between ends 13, 23 of the jaws, L=D−C, so that an actual allowance or gap, positive or negative, equal to L−(L1+L2) is provided. Such gap corresponding to the offset calculated according to the thickness of the sheet metals to be welded to ensure slight under-thickness for the thick sheet metals and a slight over-thickness for the thinnest sheet metals.

Indeed, as mentioned above, according to the thickness of the sheet metals, it may be advisable to aim at a positive actual allowance/gap or at a zero or negative actual allowance/gap.

For example, it may be considered that in a conventional cutting device with mechanical shears, for example of guillotine type, the obtained precision is ±0.02 millimeter.

Besides, in a machine according to the invention, the travel of the mobile jaw is controlled by a mechanical stop that can be adjusted to obtain a precision of +0/+0.02 millimeter. If a laser beam fusion-type cutting device is used, greater cutting accuracy may be contemplated, for example of ±0.01 millimeter.

During the heating cycle performed by the laser beam, which causes local fusion of the metal, the temperature of the whole overhang zone increases, bringing about expansion of the end of the band. The overhang will therefore increase slightly in the zone heated by the laser, thereby bringing both ends of the bands closer to one another.

It has therefore been calculated that for 6 mm thick sheet metals which would be positioned between the jaws with a overhang of around 3 mm for each end, the expansion would amount to around 8.8 micrometers for each edge. Said value being calculated by default, the bringing closer of both ends is 0.02 to 0.025 millimeter.

For thin sheet metals, for example of 0.2 mm, with a 1.5 mm overhang distance, the expansion during the welding process would amount to 5.7 micrometers per edge, i.e. a total bringing closer of the ends of 0.01 to 0.015 millimeter. These values may be considered as an additional travel $\delta$ of the mobile jaw towards the fixed jaw.

It is therefore essential, for determining the travel of the mobile jaw, to provide a preset play calculated with precision in relation to the thickness of the sheet metals to be welded and according to their later destination.

Figure 2B:
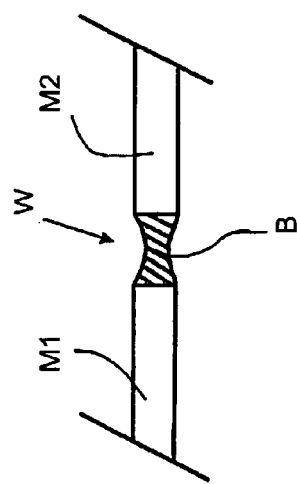
FIG. 2 represents the formation of the welding bead.
Figure 2:
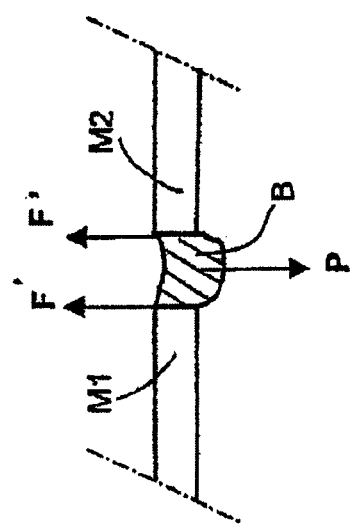

FIG. 2 represents schematically the formation of the welding bead for relatively thick sheet metals (several millimeters).

Under the effect of the heat generated by the laser beam in both ends of the bands M1 and M2, there is formed a liquid metal bath B which is balanced under the action of the superficial tension forces F and F'. Indeed, this bath is subjected on the one hand to the action of gravity (P=mg), and on the other hand to superficial tension forces appearing on both faces of the ends of the bands. Their values are $F=\iint t.ds$ wherein t is the value of the superficial tension and ds the surface element.

The superficial tension phenomena of metals, and more particularly of steel are well known and the subject of numerous studies on the formation of a meniscus, for example in continuous casting processes.

In the case of thick sheet metals, the surface element is significant and the forces supporting the metal bath B will therefore be relatively sizeable. To realise the welding bead, the mobile jaw will be positioned in a tolerance interval which is positive, which will produce a slightly hollow welding bead, at least on the upper face of the bands M1 and M2 as shown in FIG. 2. On the contrary, in the case of very thin sheet metals, whereof the thickness is of the order of a few tenth millimeters, the surface element liable to generate superficial tensions carrying the liquid bath B is very small. The weight of the bath should thus be reduced by decreasing the distance between the ends of the bands M1 and M2. In such a case, the position of the mobile jaw will be chosen in a negative or zero tolerance interval.

Figure 3A:
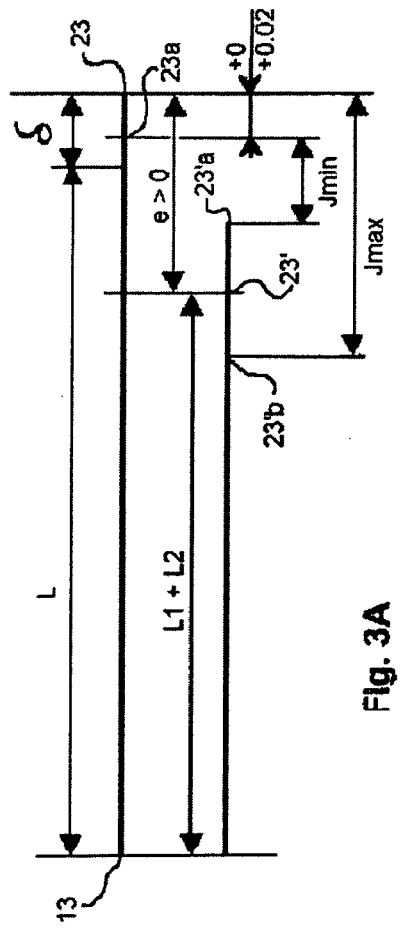
FIG. 3 represents schematically the adjustment of the travel of the mobile jaw according to the method of the invention.
Figure 3B:
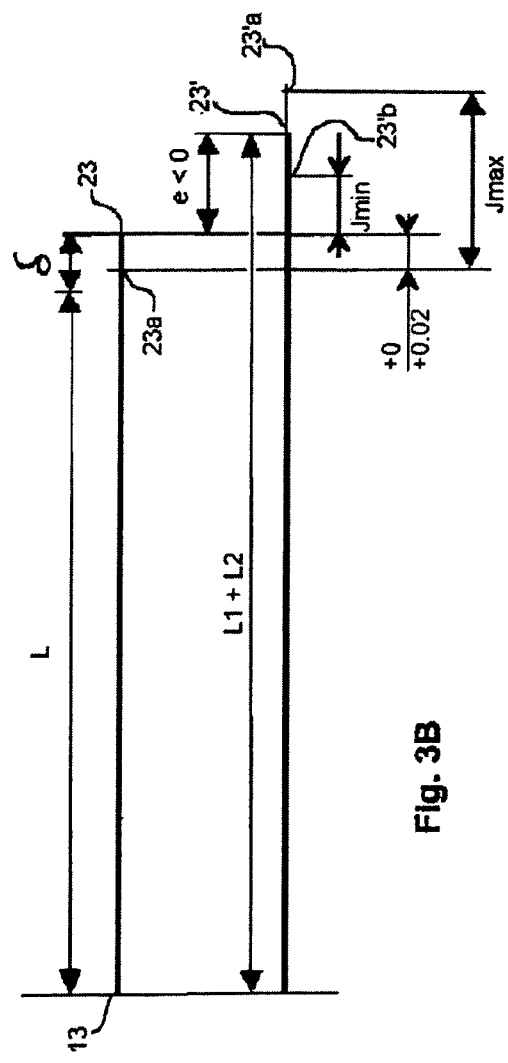

Both positioning cases are illustrated in FIGS. 3A and 3B which represent schematically the relative positions of the ends 13 of the fixed jaw S1 and 23 of the mobile jaw S2 after the bringing closer step to the welding position.

EXAMPLE 1

FIG. 3A illustrates the case of butt welding of two bands, each having a thickness around several millimeters, in a welding machine fitted with mechanical shears of a guillotine type. The thickness of these sheet metals will be reduced at a late stage in a cold roll stand. It is therefore important that the welding bead does not exhibit any excessive thickness. Besides, taking into account the thickness of the sheet metals, the liquid metal bath will be supplied sufficiently and the opposite faces have sufficient area to support the metal bath by the superficial tension forces.

As it has been said previously, the cutting accuracy obtained by mechanical shears is ±0.02 mm. The position of the mobile jaw against a mechanical stop is obtained with a tolerance interval of +0/+0.02 mm and the expansion of the overhang portion during welding is $\delta$=0.02 to 0.025 millimeter.

Taking into account the overhang distances L1 and L2, to effect simple contact between the edges of the bands, the end 23' of the mobile jaw should be spaced by the distance L1+L2 from the end 13 of the fixed jaw but, taking into account the incertitude of $\delta 0.2$ mm on the cut of each edge, this distance may be increased or decreased by 0.04 mm, the theoretic position 23' of the end of the mobile jaw being placed between points 23'$a$ and 23'$b$ in FIG. 3A.

According to the invention, the travel C of the mobile jaw is determined so that the distance L between the ends of the jaws differs from the sum L1+L2 by a preset play e which is positive in the case of relatively thick sheet metals.

But it must be also taken into account the expansion $\delta$ which increases the overhang distances $L_1$ and $L_2$ and the positioning tolerance of +0/+0,02 mm.

The preset play e between the theoretic position 23' of the end of the mobile jaw and the actual position 23 will be thereby reduced by this tolerance, i.e. 0,02 mm.

In this case, according to the invention, the adjustable stop will then be placed so that the mobile jaw follows a travel C=D−L so that L is smaller than the sum of the overhang distances with the relation: L+$\delta$=L1+L2+e.

As illustrated by FIG. 3A, end 23 of the mobile jaw will be then placed in a tolerance interval leading to a positive actual allowance between the edges 10, 20 of the sheet metals which is comprised between a minimal allowance J min, corresponding to the distance between points 23'$a$ and 23$a$, and a maximal allowance J max, corresponding to the distance between points 23'$b$ and 23.

With the above indicated digital values for thickness of the bands and tolerances, it will be advantageous to choose a positive preset play e=+0,1 mm leading to an actual allowance comprised between Jmin=0.04 mm and Jmax=0.14 mm, which allows to obtain a welding bead slightly sunken in all cases.

This type of adjustment may be used, for example for connecting hot rolled steel reels, the thickness of which ranges between 1 and a few millimeters. Such reels are conventionally connected by flash butt welding and the welding bead must then be planed, since such reels are generally cold rolled to reduce their thickness and this operation does not accept any excessive thickness.

The method of the invention enables to perform much more reliable a laser welding bead, since it does not require any planning, while obtaining a welding bead slightly less thick than the sheet metals to be connected.

EXAMPLE 2

Conversely, FIG. 3B illustrates the case of very thin sheet metals, the thickness of which may simply amount to a few tenths of a millimeter, possibly one tenth of a millimeter.

In this example the connection of two sheet metals is made by laser beam butt welding in a machine which also enables to cut the ends of the bands by fusion and separation by means of a laser beam.

In such a machine, the cutting accuracy is assessed to be ±0.01 mm, the positioning accuracy of the mobile jaw using an adjustable mechanical stop is the same, i.e. +0/+0.2 mm. It has been assessed that, in the case of a 0.2 mm thick sheet metal, the ends of the bands M1 and M2 would be respectively held in the jaws S1 and S2 with an overhang length of around 1.5 mm, and, in such a case, the total expansion caused by the laser beam heating would be between 0.01 and 0.015 mm.

As in the preceding case, the theoretical position 23' of the end of the mobile jaw 2, which only corresponds to a contact between the ends, is within points 23'a and 23'b, spaced apart of 0.04 mm if the cutting accuracy is ±0.01 mm.

Taken into account the expansion δ, after the jaws having been brought closer, the effective position 23 of the end of the mobile jaw is at a distance equal to L+δ from the end 13 of the fix jaw. And, in the case of thin sheet metal, the adjustable stop is located so that the mobile jaw travels over a distance C=D−L, which is slightly greater than the reference distance D', the play e being negative in such a case.

As shown in FIG. 3B, taken into account the positioning accuracy of the mobile jaw, the end 23 thereof will be then placed in a tolerance interval leading to a negative actual allowance, i.e. to an interference of the two sheet metals. This negative actual allowance between the edges 10, 20 of the sheet metals is comprised between a minimal allowance J min, corresponding to the distance between points 23 and 23'b, and a maximal allowance J max, corresponding to the distance between points 23a and 23'a.

With the above indicated numerical values of the thicknesses and the accuracies, a preset gap e=−0.03 mm may be selected and leads to a negative actual allowance between Jmin=−0.01 mm and Jmax=−0.07 mm.

In this precise case, with the selected adjustment of the travel within the tolerance interval, the expansion δ maintains the two sheet metals in contact with one another, with an overpressure small enough so as not to generate a buckling but strong enough to support the metal bath B for making a welding bead of a great quality, in which there is no discontinuity.

However, according to the thicknesses of the sheet metals M1 and M2, an excessive thickness could be generated, and this method of adjustment could be applied for sheet metals which are not subsequently processed in a cold rolling machine.

Conventionally, for example in a galvanisation line which can be fitted with a skin-pass roll stand and with a shaping machine, one knows that welding is performed by a castor-type welding machine and an excessive thickness of the order of 10% of the thickness of the band is accepted perfectly. Thanks to the method of the invention, a welding bead of such type is realised in a perfectly reliable fashion and with an excessive thickness reduced to a value close to zero.

Thus, the invention enables to obtain a positive actual allowance or a negative or null actual allowance, in relation to the thickness of the bands and taken into account accuracies in order to control the thickness of the welding bead.

However, in certain cases, it could be better to give the preference to the obtention of an actual allowance always positive, to allow its measurement. In a more perfected embodiment of the invention, the method may further comprise the measurement of a residual space between the ends of the bands M1 and M2 after the mobile jaw S2 have been positioned, and the modification of the position of the adjustable stop of the measured value.

In so doing, if the downstream process requires a very high quality for the welding bead, which cannot be guaranteed by the tolerance interval, one may then use the method of the invention as a pre-adjustment, followed with a measurement of the residual actual allowance between both ends of the bands M1 and M2, in order to correct the position of the mobile jaw S2 is corrected by moving the adjustable mechanical stop of the measured value.

Indeed, in a preferred embodiment, a stop adjustable by a wedge-type device may be used. The mobile jaw is then permanently applied by actuators against said stop. Once the travel is completed, the wedge-type device enables to modify the on-load adjustment. It is indeed not a new travel, but a correction by several hundredths of millimeters. To measure the actual allowance between both edges 10 and 20 of the sheet metals once in place, one may use an optical system as described in the U.S. Pat. No. 4,854,493 or any other appropriate device, magnetic, pneumatic or capacitive.

In a particular embodiment where both stops may be adjusted independently from one another, it may also be contemplated to measure the actual allowance between both sheet metals in two points so as to be able to compensate for a parallelism defect, in case a cutting defect is suspected, for example when a machine is initially fitted with two mechanical shears which may have different alignment.

Finally, in a particularly advantageous embodiment of the invention, the cut step of the ends 1 and 2 of the bands M1 and M2 is performed by fusion and separation by means of a laser beam. The same laser source may be used for both beams. In such a case, different beam guiding and concentration optical paths enable to displace the cutting beam along plane X1 for band M1 and along plane X2 for band M2, and to move the welding beam along plane X1 which is then the plane wherein both bands to be connected have been placed end to end.

The description of all these embodiments is not limitative of the invention, one may use a machine whereof the guiding and the control of the mobile jaw will be different, as well as the arrangement and the adjustment of the stops. One may also contemplate direct control of the mobile jaw by displacement sensors and electronic slaving without departing from the framework of the invention.

The references and signs in the figures are only given for illustrating purposes and should not be construed as limiting the scope of the invention.

The invention claimed is:

1. In a continuous line processing installation, a method for butt welding two bands running successively along a longitudinal direction, using a laser beam and without using filler material, the method comprising the steps of:
   calculating an offset based on the thickness of the bands to be welded, while taking into account the degree of accuracy of the positioning, and of the cutting, of two edges to be butt welded, the offset being counted as positive or negative in order to be subtracted or added to a reference distance;
   calculating a travel distance from the reference distance and the calculated offset;
   in the running direction, holding a downstream end of a first band in a first double-jaw clamp and an upstream end of a second band in a second double-jaw clamp to immobilize the downstream end of the first band and the upstream end of the second band;
   while immobilized, cutting the downstream and upstream ends to provide, respectively, a first rectilinear cut edge and a second rectilinear cut edge parallel to the first rectilinear cut edge, each of the first and second cut edges being spaced away from an end of the jaws of the corresponding double-jaw clamp by an overhang distance;

separating the first and second cut edges by the reference distance, whereby, since the butt weld is created without using any filler material, the reference distance is unrelated to any material thickness of a filler material;

displacing at least one of the first and second double-jaw clamps towards the other one of the first and second double-jaw clamps to obtain a final welding position, the total amount of relative displacement being equal to the calculated travel distance, the final welding position defining a gap between the cut edges having the same sign, positive or negative, as the calculated offset; and passing the laser beam along a contact plane between the cut edges to make a welding bead without using a filler material.

2. The method according to claim 1, characterised in that the offset has a negative or zero value to obtain a welding bead thicker than each band to be welded.

3. The method according to claim 1, characterised in that the offset has a non-zero positive value to obtain a welding bead less thick than each band to be welded.

4. The method according to claim 1, characterised in that, for calculating the offset, the cutting accuracy of each of the band ends, the positioning tolerance of the mobile jaw and the expansion of the band ends are taken into account, to obtain, in the final welding position, a gap, the amplitude of which depends on the chosen value of the offset but remains included within a tolerance interval allowing to control the thickness of the welding bead as a function of the thickness of the bands.

5. The method according to claim 1, characterised in that, one of said clamping means being a mobile jaw, the final welding position of the mobile jaw being obtained by stopping a reference surface belonging the mobile jaw against at least one adjustable mechanical stop resulting in a predetermined gap.

6. The method according to claim 5, characterised in that after placing the mobile jaw in the final welding position, the value of a residual allowance existing between both bands is measured and the position of the mobile jaw is corrected by said value by a modification of the position of the stops adjusting the limit of travel of the mobile jaw.

7. The method according to claim 6, characterised in that after placing the mobile jaw in the final welding position, the value of the residual allowance existing between both bands is measured at one point and the position of the mobile jaw is corrected by said value by an equal modification of the position of the stops adjusting the limit of travel of the mobile jaw.

8. The method according to claim 6, characterised in that after placing the mobile jaw in the final welding position, the value of the residual allowance existing both bands is measured at two points and the position of the mobile jaw is corrected by said value by a differential modification of the position of the stops adjusting the limit of travel of the mobile jaw.

9. The method according to claim 1, characterised in that the step of cutting the ends of the bands to be welded is performed using a blade shearing machine.

10. The method according to claim 1, characterised in that the step of cutting the ends of the bands to be welded is performed using a laser beam.

11. The method according to claim 10, characterised in that the ends of the bands to be welded are cut by a laser beam using the same source as the laser used to generate the welding beam.

12. The method according to claim 2, characterised in that the step of cutting the ends of the bands to be welded is performed using a laser beam.

13. The method according to claim 12, characterised in that the ends of the bands to be welded are cut by a laser beam using the same source as the laser used to generate the welding beam.

14. The method according to claim 3, characterised in that the step of cutting the ends of the bands to be welded is performed using a laser beam.

15. The method according to claim 14, characterised in that the ends of the bands to be welded are cut by a laser beam using the same source as the laser used to generate the welding beam.

16. The method according to claim 4, characterised in that the step of cutting the ends of the bands to be welded is performed using a laser beam.

17. The method according to claim 16, characterised in that the ends of the bands to be welded are cut by a laser beam using the same source as the laser used to generate the welding beam.

18. The method according to claim 5, characterised in that the step of cutting the ends of the bands to be welded is performed using a laser beam.

19. The method according to claim 18, characterised in that the ends of the bands to be welded are cut by a laser beam using the same source as the laser used to generate the welding beam.

20. The method according to claim 6, characterised in that the step of cutting the ends of the bands to be welded is performed using a laser beam.

21. The method according to claim 20, characterised in that the ends of the bands to be welded are cut by a laser beam using the same source as the laser used to generate the welding beam.

22. The method according to claim 7, characterised in that the step of cutting the ends of the bands to be welded is performed using a laser beam.

23. The method according to claim 22, characterised in that the ends of the bands to be welded are cut by a laser beam using the same source as the laser used to generate the welding beam.

24. The method according to claim 8, characterised in that the step of cutting the ends of the bands to be welded is performed using a laser beam.

25. The method according to claim 24, characterised in that the ends of the bands to be welded are cut by a laser beam using the same source as the laser used to generate the welding beam.

* * * * *